United States Patent
Van Dyck et al.

(10) Patent No.: US 10,710,410 B2
(45) Date of Patent: Jul. 14, 2020

(54) POLYURETHANE FILLED TIRES

(71) Applicant: HUNTSMAN INTERNATIONAL LLC, The Woodlands, TX (US)

(72) Inventors: Johan Van Dyck, Meeuwen-Gruitrode (BE); Dieter Niclaes, Boutersem (BE); Siddharth Sahu, Tervuren (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 14 days.

(21) Appl. No.: 15/104,054

(22) PCT Filed: Sep. 15, 2014

(86) PCT No.: PCT/EP2014/069609
§ 371 (c)(1),
(2) Date: Jun. 13, 2016

(87) PCT Pub. No.: WO2015/090653
PCT Pub. Date: Jun. 25, 2015

(65) Prior Publication Data
US 2016/0311260 A1    Oct. 27, 2016

(30) Foreign Application Priority Data

Dec. 20, 2013 (EP) ..................................... 13198741
Dec. 20, 2013 (IN) ........................... 3729/DEL/2013

(51) Int. Cl.
| | | |
|---|---|---|
| *B29C 41/00* | (2006.01) | |
| *B29C 44/04* | (2006.01) | |
| *B29D 30/02* | (2006.01) | |
| *B60C 1/00* | (2006.01) | |
| *B60C 7/00* | (2006.01) | |
| *B60C 7/10* | (2006.01) | |
| *C08G 18/08* | (2006.01) | |
| *C08G 18/40* | (2006.01) | |
| *C08G 18/48* | (2006.01) | |
| *C08G 18/63* | (2006.01) | |
| *C08J 9/14* | (2006.01) | |
| *C08G 18/10* | (2006.01) | |
| *C08G 101/00* | (2006.01) | |
| *B29C 41/04* | (2006.01) | |
| *B29K 75/00* | (2006.01) | |
| *B29K 105/00* | (2006.01) | |
| *B29K 105/04* | (2006.01) | |

(52) U.S. Cl.
CPC .............. *B60C 7/105* (2013.01); *B29D 30/02* (2013.01); *C08G 18/10* (2013.01); *C08G 18/14* (2013.01); *C08G 18/4072* (2013.01); *C08G 18/4829* (2013.01); *C08G 18/4854* (2013.01); *C08G 18/632* (2013.01); *C08J 9/142* (2013.01); *C08J 9/146* (2013.01); *B29C 41/003* (2013.01); *B29C 41/042* (2013.01); *B29K 2075/00* (2013.01); *B29K 2105/0005* (2013.01); *B29K 2105/0014* (2013.01); *B29K 2105/04* (2013.01); *B60C 2001/0091* (2013.01); *B60C 2200/12* (2013.01); *C08G 2101/0008* (2013.01); *C08G 2101/0066* (2013.01); *C08G 2101/0083* (2013.01); *C08G 2350/00* (2013.01); *C08G 2380/00* (2013.01); *C08J 2203/12* (2013.01); *C08J 2203/142* (2013.01); *C08J 2375/08* (2013.01)

(58) Field of Classification Search
CPC .... C08G 18/14; C08G 2380/00; C08G 18/63; C08G 18/632; C08G 18/637
See application file for complete search history.

(56) References Cited

U.S. PATENT DOCUMENTS

| | | | |
|---|---|---|---|
| 3,605,848 A | 9/1971 | Lombardi et al. | |
| 4,125,691 A | 11/1978 | White | |
| 4,206,170 A | 6/1980 | Hogan et al. | |
| 6,031,010 A * | 2/2000 | Lin ........................ | C08G 18/10 521/159 |
| 6,303,060 B1 | 10/2001 | Lobo et al. | |
| 6,431,235 B1 * | 8/2002 | Steinke ................... | B60B 1/003 152/310 |
| 2008/0125503 A1 * | 5/2008 | Henning .............. | C08G 18/289 521/106 |
| 2010/0028568 A1 * | 2/2010 | Weaver .................. | C08G 18/69 428/17 |
| 2018/0319926 A1 * | 11/2018 | Fregni ................ | C08G 18/4841 |

FOREIGN PATENT DOCUMENTS

| | | |
|---|---|---|
| WO | 2001/018086 A | 3/2001 |
| WO | 2009/129944 A | 10/2009 |
| WO | WO-2012101086 A1 * | 8/2012 |

\* cited by examiner

*Primary Examiner* — Melissa A Rioja
(74) *Attorney, Agent, or Firm* — Huntsman International LLC; Robert Diaz

(57) ABSTRACT

Polyurethane elastomeric compositions for making tires, methods for making said tires and tires made of said polyurethane elastomers. Said tires are in particular suitable for use as tires for low speed vehicles such as bicycle tires.

20 Claims, No Drawings

POLYURETHANE FILLED TIRES

CROSS-REFERENCE TO RELATED APPLICATIONS

This application is the National Phase of International Application PCT/EP2014/069609 filed Sep. 15, 2014 which designated the U.S. and which claims priority to European App. Serial No. 13198741.4 filed Dec. 20, 2013 and Indian App. Serial No. 3729/DEL/2013 filed Dec. 20, 2013. The noted applications are incorporated herein by reference.

FIELD OF INVENTION

The present invention relates to methods for improving the dynamic performance of tires, in particular bicycle tires, made of a cellular polyurethane elastomeric material. More specifically reducing the rolling resistance of the polyurethane elastomer. Therefore, the invention relates to a specific developed polyurethane elastomer.

The present invention relates to methods for making polyurethane tires with improved dynamic performance while maintaining good hydrolysis resistance and wear resistance.

The present invention further relates to a method for making polyurethane elastomers suitable for use as tires, thereby controlling phase separation issues while using rotating moulding for fabricating the tires.

The present invention further relates to a reactive composition comprising polyisocyanates and polyisocyanate reactive products for making the polyurethane elastomeric tires according to the invention.

The present invention further relates to tires, preferably bicycle tires made of a polyurethane elastomer.

BACKGROUND OF THE INVENTION

Pneumatic tires are commonly used in on-road vehicles such as automobiles and trucks. Pneumatic tires have the advantages of being light in weight and providing a soft and comfortable ride, because the tire casing is filled with a gas or air. The main disadvantage of pneumatic tires is the risk of deflation due to punctures, separation of the tire casing from the rim, or other failure of the tire casing or rim.

U.S. Pat. No. 6,303,060 discloses a non-deflatable tire assembly having a hollow toroid-shaped flanged insert and a flexible body molded around the insert to form a tire, and at least one rim onto which is mounted the tire. The flexible body is made of a polyurethane foam formed of a combination of polyol and polyisocyanate, while the insert is made of another material such as high density polyethylene. The hollow insert itself is required to provide load carrying stiffness to the tire, thereby contributing to a cushioned ride. Although the hollow internal area is reduced in dimension, the tire is not completely non-deflatable and hollow areas are still required to achieve acceptable mechanical properties.

Furthermore, the polyurethane foam used has a too high compression set value (in the range 10-20%).

U.S. Pat. No. 4,125,691 discloses a zero pressure device composed of either a microcellular or homogeneous polyurethane made by reacting an organic polyisocyanate with at least three polyols, a monomeric polyol of 2 to 3 hydroxyls having a molecular weight less than 250, a polyether triol having a molecular weight of 4600 to 6000 and a polyether glycol having a molecular weight of 3500 to 4200. The organic polyisocyanate used is a quasi prepolymer made by reacting MDI with a polypropylene ether triol. US'691 further discloses examples wherein 2 pbw acrylonitrile grafted polypropylene ether glycol (polymer polyol) is added to the reactive mixture. Using polypropylene based quasi prepolymers will lead to polyurethane materials having a too low ball rebound and a too low hardness will be achieved due to insufficient amounts of polymer polyols.

For above reasons, filled tires are more attractive than pneumatic tires. A filled tire contains a solid or semi-solid material instead of a compressed gas. This eliminates the risk of deflation, as a puncture or other failure of the tire casing will not lead to an escape of gas.

However a tire fill material should meet several requirements to compete with the good dynamic properties of pneumatic tires. For example the tire fill material should allow the tire to absorb shock and provide good traction. Therefore, the tire fill material should be soft and flexible. In addition, the tire fill material should be such that the tire does not build up excessive heat during use, as the heat can damage the fill material or the casing and thus diminish the useful life of the tire. In addition, cost is a very important concern.

Soft polyurethane/urea elastomers have been used as a tire fill material in the past and several approaches have been tried. In some cases, the polyurethane/urea polymer has been foamed using carbon dioxide that is generated in a reaction between water and an organic isocyanate. Such an approach is described in U.S. Pat. No. 3,605,848. These foams have the advantages of light weight due to their cellular nature, and of being too soft and the foams tend to exhibit high hysteresis and high heat build-up.

Polyesterol-containing soft phases lead to the highest level of dynamic properties in cellular PU elastomers having a urea hard phase. Products of this type are also well known. For example WO 2001018086 describes the use of polyester polyetherol obtainable via polycondensation of polyoxytetramethylene glycol whose average molar mass is from 220 to 270 g/mol and adipic acid, for the production of cellular polyurethane elastomers with good dynamic properties and with high low-temperature flexibility. However, the ester bonds make the resultant foam susceptible to hydrolysis.

DE-A 3613964 describes the production of products based on pure polyester soft phases and, respectively, polyester-polyetherol soft phases. The test specimens based on polytetrahydrofuran (M=2000 g/mol) as soft phase in the comparative example in DE-A 3613964 had only comparatively low flexural strength.

The overall disadvantage of the cellular polyurethane elastomers known in the prior art and used for tires is fact that they do not retain the desired shape if the polyurethane elastomer is subject to an increased temperature and they do not withstand contact with moisture and/or to high pressure acting on the elastomer.

For all reasons above indicated there is a need to develop a new polyurethane elastomeric material which has very good dynamic properties and which is able do retain the desired shape if the polyurethane elastomer is subject to an increased temperature and to withstand contact with moisture and/or to high pressure acting on the elastomer.

AIM OF THE INVENTION

It is a goal of the invention to improve the properties of a polyurethane elastomer such that its dynamic performance and resistance (more specific hydrolysis resistance and wear resistance) are satisfactory for use as bicycle tires and becomes comparable to pneumatic tires.

It is a further object of the present invention to develop a reactive composition and a method for making solid tires, more particular bicycle tires, made of a cellular (foamed) polyurethane elastomeric material.

SUMMARY OF THE INVENTION

This invention relates to polyurethane elastomeric compositions for making tires, to methods for making said tires and to tires made of said polyurethane elastomers. Said tires are in particular suitable for use as tires for low speed vehicles such as bicycle tires, however the invention is not limited to bicycle tires (such as tires for wheelchairs, trolleys, push-carts, pull-carts, . . . ).

Surprisingly we have found a cellular (foamed) polyurethane elastomeric material that has satisfactory dynamic performance and thereby maintains excellent hydrolysis resistance and wear resistance performance. The polyurethane elastomeric composition according to the invention makes it possible to compete with the properties of pneumatic tires. On top of that the polyurethane elastomeric tires according to the invention are solid tires (made of cellular polyurethane) which reduces the risk of deflation due to punctures, separation of the tire casing from the rim, or other failure of the tire casing or rim to almost zero.

According to a first aspect, a filled tire made of a cellular polyurethane or polyurethane-urea elastomeric material is disclosed, said elastomeric material having the following properties:
Shore A hardness (according to ASTM D2240) of at least 45 and lower than 85, preferably in the range 45-80;
Compression set at room temperature lower than 10% and at 70° C. lower than 40% (according to ASTM D395);
Ball rebound (according to ASTM D3574) of at least 40%, preferably from 40 to 70%;

According to embodiments of the invention, the tire is a low speed vehicle tire such as a bicycle tire.

According to embodiments of the invention, the tire is made of a cellular polyurethane elastomeric material having a moulded density in the range 400-700 kg/m$^3$, preferably in the range 500-600 kg/m$^3$ and a Free Rise Density in the range 250-350 kg/m$^3$' preferably in the range 300-320 kg/m$^3$ (according to ISO 845)

According to a second aspect, a reaction system for making the cellular polyurethane elastomer according to the invention is disclosed, said reaction system comprising at least:
a polyisocyanate composition having a free NCO-value of 15-25% by weight comprising an isocyanate-terminated prepolymer which is the reaction product of an excess of an organic polyisocyanate and a polyether polyol having an average nominal hydroxyl functionality of 2-6, a number average molecular weight of 2000-6000 and an ethylene oxide content of 20-35% by weight, wherein at least 50% of the ethylene oxide groups are present at the end of the polyether polyol, and
at least one polymer polyetherpolyol having a molecular weight in the range 2000-7000 and having solid particles in the range of 15-35 wt % calculated on the total weight of the polyol; and
chain extenders, and
catalysts, and
blowing agents According to embodiments of the invention, the organic polyisocyanates used in the reaction system for the preparation of the polyisocyanate according to the invention is selected from aliphatic, cycloaliphatic and/or araliphatic polyisocyanates, preferably selected from aromatic polyisocyanates, more preferably from diphenylmethane diisocyanate (MDI) based polyisocyanates, most preferably diphenylmethane diisocyanate (MDI) based polyisocyanates having >95% wt 4,4'-MDI calculated on the total weight of the organic polyisocyanate mixture.

According to embodiments of the invention, the polyether polyols used for preparing the prepolymer in the reaction system for the preparation of the polyisocyanate composition according to the invention contain 20-35% by weight ethylene oxide groups wherein at least 50%, preferably at least 75% and more preferably all (100%) of these ethylene oxide groups are present at the end of the polyether polyol (tipped) and wherein said polyether polyols have an average nominal functionality of 2-6, preferably of 2-4, a number average molecular weight of 2000-6000 and preferably 2000-5000 and most preferably of 3000-5000.

According to embodiments of the invention, the polyether polyols used for preparing the prepolymer in the reaction system for the preparation of the polyisocyanate composition according to the invention are selected from poly(oxyethylene-oxypropylene) diols and triols.

According to embodiments of the invention, the at least one polymer polyetherpolyol in the reaction system according to the invention is selected from a filled polyether polyol having solid particles in the range of 15-35 wt % calculated on the total weight of the polyol and is having an ethylene oxide content of maximum 20% by weight, preferably in the range 10-20% by weight and wherein the ethylene oxide groups are present at the end of the polyether polyol (tipped).

According to embodiments of the invention, the at least one polymer polyetherpolyol in the reaction system according to the invention is selected from a filled polyether polyol having solid particles in the range of 15-35 wt % calculated on the total weight of the polyol and wherein said polymer polyol is a dispersion of polymer solid particles such as styrene based polymer particles, preferably styrene-acrylonitrile particles.

According to embodiments of the invention, the at least one polymer polyetherpolyol in the reaction system according to the invention is a mixture of a first polyether polyol and a second polyetherpolyol having solid particles in the range of 15-35 wt % calculated on the total weight of the polyol mixture and wherein
the first polyetherpolyol is having a molecular weight in the range of 5000-7000 and an ethylene oxide content of 10-20% by weight and the ethylene oxide groups are present at the end of the polyether polyol (tipped)
the second polyetherpolyol is having a molecular weight in the range of 4000-6000, preferably around 5000 and an ethylene oxide content of 10-20% by weight and wherein the ethylene oxide groups are present at the end of the polyether polyol (tipped), and
the molecular weight of the mixture is preferably in the range 4000-7000 and wherein the ratio of the first polyetherpolyol to the second polyetherpolyol is preferably in the range 20/80 up to 40/60

According to embodiments of the invention, the at least one polymer polyetherpolyol in the reaction system according to the invention is a mixture of a first polyether polyol and a second polyetherpolyol having solid particles in the range of 15-35 wt % calculated on the total weight of the polyol mixture and wherein the first polyetherpolyol is having a molecular weight in the range of 1000-2000 and is selected from polytetrahydrofuran the second polyetherpolyol is having a molecular weight in the range of 4000-6000, preferably around 5000 and an ethylene oxide content of 10-20% by weight and wherein the ethylene oxide groups are present at the end of the polyether polyol (tipped), and the molecular weight of the mixture is preferably in the range 2000-4000 and wherein the ratio of the first polyetherpolyol to the second polyetherpolyol is preferably in the range 80/20 up to 40/60

According to embodiments of the invention, the blowing agents used in the reaction system according to the invention are selected from fluor based hydrocarbon compounds (hydrofluorcarbon compounds) and/or acetal based compounds and/or water.

According to embodiments of the invention, the blowing agent(s) used in the reaction system according to the invention is an acetal based compound such as methylal and is used preferably in the absence of other blowing agents in the range 4-8 wt % calculated on the total weight of the reaction system.

According to embodiments of the invention, the blowing agent(s) used in the reaction system according to the invention is water, preferably in the absence of other blowing agents, and is used in the range of at least 0.3 parts by weight, preferably from 0.3 to 1.3 parts by weight, per 100 parts of the reaction system.

According to embodiments of the invention, the reaction system according to the invention may further comprise additives like catalysts, surfactants, colorants, stabilisers, fillers and mold release agents.

According to embodiments of the invention, the chain extender(s) and/or cross-linkers used in the reaction system according to the invention are selected from polyols having an hydroxyl functionality of 2-6 and preferably 2-4 and a molecular weight of 62-499 such as ethylene glycol, diethylene glycol, propylene glycol, dipropylene glycol, butane diol, glycerol, trimethylolpropane, hexanediol, pentaerythritol and polyethylene glycols of MW of 499 and less and wherein the amount of chain extenders and cross-linker is at most 15 parts by weight per 100 parts by weight of polyol used to react with the polyisocyanate composition, more preferably the amount of chain extenders and cross-linker is in the range 5-15 parts by weight per 100 parts by weight of polyol used to react with the polyisocyanate composition.

According to embodiments of the invention, the chain extender(s) and/or cross-linkers used in the reaction system according to the invention is selected from mono ethylene glycol (MEG), butanediol and/or hexanediol.

According to a third aspect, a process for making the polyurethane elastomer according to the invention is disclosed, said process comprising reacting at an isocyanate index in the range 90-110, preferably in the range 100-105 the reactive system according to the second aspect of the invention.

According to embodiments of the invention, the process for making the polyurethane elastomer according to the invention is such that the polymer polyetherpolyol is pre-mixed with the chain extenders, catalysts, blowing agents, and other additives and then reacted with the polyisocyanate composition.

According to embodiments of the invention, the process for making the polyurethane elastomer according to the invention comprises at least the steps of:

i. pre-mixing the polymer polyetherpolyol with the chain extenders, catalysts, blowing agents, and other additives, and then ii. mixing the polyisocyanate composition with the pre-mixed polymer polyetherpolyol obtained in step i) and then iii. casting the mixed polyisocyanate composition obtained in step ii) into a mould to obtain a reacted polyisocyanate composition, and then iv. curing the reacted polyisocyanate composition obtained in step iii) at an elevated temperature, and then v. demoulding the obtained tire made of polyurethane cellular elastomer.

According to embodiments of the invention, the process for making the polyurethane elastomer according to the invention is such that the step of mixing the polyisocyanate composition with the pre-mixed polymer polyetherpolyol obtained in step i) is performed using a 2 component high pressure mixing system or a 2 component dynamic mixing system.

According to embodiments of the invention, the process for making the polyurethane elastomer according to the invention is such that the step of casting the mixed polyisocyanate composition obtained in step ii) is performed using an open mould, preferably a rotating open mould preferably at a rotation speed in the range 150-250 rpm and wherein the step of curing the reacted polyisocyanate composition obtained in step iii) is performed at elevated temperatures in the range 50-60° C.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

DEFINITIONS AND TERMS

In the context of the present invention the following terms have the following meaning:

1) The isocyanate index or NCO index or index is the ratio of NCO-groups over isocyanate-reactive hydrogen atoms present in a formulation, given as a percentage:

$$\frac{[NCO] \times 100(\%)}{[\text{active hydrogen}]}$$

In other words the NCO-index expresses the percentage of isocyanate actually used in a formulation with respect to the amount of isocyanate theoretically required for reacting with the amount of isocyanate-reactive hydrogen used in a formulation.

It should be observed that the isocyanate index as used herein is not only considered from the point of view of the actual polymerisation process preparing the material involving the isocyanate ingredients and the isocyanate-reactive ingredients. Any isocyanate groups consumed in a preliminary step to produce modified polyisocyanates (including such isocyanate-derivatives referred to in the art as prepolymers) or any active hydrogens consumed in a preliminary step (e.g. reacted with isocyanate to produce modified polyols or polyamines) are also taken into account in the calculation of the isocyanate index.

2) The expression "isocyanate-reactive hydrogen atoms" as used herein for the purpose of calculating the isocyanate index refers to the total of active hydrogen atoms in hydroxyl and amine groups present in the reactive compositions; this means that for the purpose of calculating the isocyanate index at the actual polymerisation process one hydroxyl group is considered to comprise one reactive hydrogen, one primary amine group is considered to comprise one reactive hydrogen and one water molecule is considered to comprise two active hydrogens.

3) The term "average nominal hydroxyl functionality" (or in short "functionality") is used herein to indicate the number average functionality (number of hydroxyl groups per molecule) of the polyol or polyol composition on the assumption that this is the number average functionality (number of active hydrogen atoms per molecule) of the initiator(s) used in their preparation although in practice it will often be somewhat less because of some terminal unsaturation.

4) The word "average" refers to number average unless indicated otherwise.

5) "Liquid" means having a viscosity of less than 10 Pa·s measured according to ASTM D445-11a at 20° C.

6) "pbw" means part by weight.

7) The term "reaction system" refers to a combination of ingredients wherein the polyisocyanate composition is kept in a container separate from the isocyanate-reactive ingredients.

8) The term "filled tires" as used herein refers to tires which do not contain hollow inserts containing air or compressed gas. These tires are preferably completely made of polymeric materials, such as foamed polyurethane.

DETAILED DESCRIPTION

According to a first aspect of the invention, a tire made of a cellular polyurethane elastomeric material is disclosed, in particular low speed vehicle tires such as bicycle tires. Said cellular polyurethane elastomeric material is having the following properties:

Shore A hardness (according to ASTM D2240) of at least 45 and lower than 85, preferably in the range 45-80;

Compression set at room temperature lower than 10% (according to ASTM D395) and at 70° C. lower than 40%;

Ball rebound (according to ASTM D3574) of at least 40%, preferably from 40 to 70%;

According to embodiments, the cellular polyurethane elastomeric material according to the invention is having a moulded density in the range 400-700 kg/m$^3$, preferably 500-600 kg/m$^3$ According to embodiments, the cellular polyurethane elastomeric material according to the invention is having a Free Rise Density in the range 250-350 kg/m$^3$ preferably in the range 300-320 kg/m$^3$ measured according to ISO 845.

According to embodiments, the cellular polyurethane elastomeric material according to the invention is having a compression set at room temperature (according to ASTM D395) lower than 10%, such as compression set values of 3.4%, 4.3%, 5% and 6%.

According to embodiments, the Shore A hardness of the cellular polyurethane elastomeric material according to the invention at least 50 and lower than 85, preferably in the range 50-80.

According to embodiments, the Shore A hardness of the cellular polyurethane elastomeric material according to the invention may be different depending on the application. For use as tires in children bikes, the hardness is preferably in the range 45-55, more preferably in the range 50-55 while for use as tires in adult bikes, the hardness is preferably in the range 70-80.

According to embodiments, the tire is completely made of the cellular polyurethane elastomeric material according to the invention.

According to embodiments, the tire is completely made of the cellular polyurethane elastomeric material according to the invention and may optionally be coated with an additional layer, such as a protective wear layer.

According to a second aspect of the invention a reaction system for making the cellular polyurethane elastomer according to the first aspect of the invention is disclosed. Said reaction system comprising at least:

a) a polyisocyanate composition having a free NCO-value of 15-25% by weight comprising an isocyanate-terminated prepolymer which is the reaction product of an excess of an organic polyisocyanate and a polyether polyol having an average nominal hydroxyl functionality of 2-4, a number average molecular weight of 2000-6000 and an ethylene oxide content of 20-35% by weight, wherein at least 50% of the ethylene oxide groups are present at the end of the polyether polyol, and b) at least one polymer polyetherpolyol having a molecular weight in the range 2000-7000 and having solid particles in the range of 15-35 wt % calculated on the total weight of the polyol; and c) chain extenders, and d) catalysts, and e) blowing agents The organic polyisocyanates which may be used in the preparation of the polyisocyanate compositions of the invention include aliphatic, cycloaliphatic and araliphatic polyisocyanates, for example hexamethylene diisocyanate, isophorone diisocyanate, cyclohexane-1,4-diisocyanate, dicyclo-hexylmethane-4,4-diisocyanate an p-xylylene diisocyanate.

Preferred polyisocyanates, however, are the aromatic polyisocyanates, for example phenylene diisocyanates, tolylene diisocyanates, 1,5-naphthylene diisocyanate and especially the available diphenylmethane diisocyanate (MDI) based polyisocyanates like MDI isomers, that is to say 4,4'-diphenylmethane diisocyanate, 2,4'-diphenylmethane diisocyanate and mixtures thereof.

More preferably the amount of 4,4'-diphenylmethane diisocyanate used as organic polyisocyanate is more than 95 wt % calculated on the total weight of the organic polyisocyanate, most preferably the amount of 4,4'-diphenylmethane diisocyanate used as organic polyisocyanate is more than 97 wt % calculated on the total weight of the organic polyisocyanate.

Whilst diisocyanates are the preferred polyisocyanates for use in the preparation of the polyisocyanate compositions, mixtures of diisocyanates with minor proportions of higher functionality polyisocyanates may be used if desired. Other MDI variants are well known in the art and include liquid products obtained by the introduction of urethane, allophanate, urea, biuret, carbodiimide, uretonimine and/or isocyanurate residues.

According to embodiments, the polyether polyols used for preparing the prepolymer contain 20-35% by weight ethylene oxide groups wherein at least 50%, preferably at least 75% and more preferably all (100%) of these ethylene oxide groups are present at the end of the polyether polyol (tipped). These polyether polyols have an average nominal functionality of 2-6, preferably of 2-4. They have a number average molecular weight of 2000-6000 and preferably 2000-5000 and most preferably of 3000-5000.

Polyether polyols which may be used for preparing the isocyanate-terminated prepolymer include products obtained by the polymerisation of ethylene oxide with another cyclic oxide, for example propylene oxide or tetrahydrofuran in the presence of polyfunctional initiators. Suitable initiator compounds contain a plurality of active hydrogen atoms and include water and polyols, for example ethylene glycol, propylene glycol, diethylene glycol, dipropylene glycol, cyclohexane dimethanol, resorcinol, bisphenol A, glycerol, trimethylolpropane, 1,2,6-hexanetriol or pentaerythritol. Mixtures of initiators and/or cyclic oxides may be used.

Especially useful polyether polyols include poly(oxyethylene-oxypropylene) diols and triols obtained by the sequential addition of propylene and ethylene oxides to di- or trifunctional initiators as fully described in the prior art. Mixtures of the said diols and triols can be useful as well.

The isocyanate-terminated prepolymer is prepared by reaction of an excessive amount of the polyisocyanate with the polyether polyol in order to obtain a prepolymer having the indicated NCO value. Methods to prepare prepolymers have been described in the art. The relative amounts of polyisocyanate and polyether polyol depend on their equivalent weights and on the desired NCO value and can be determined easily by those skilled in the art. If desired, the reaction may be conducted in the presence of catalysts which enhance the formation of urethane groups, like tertiary amines and tin compounds. In general the reaction time is between 30 minutes and 4 hours and the temperature between 50 and 90° C.

At least 90% of the groups obtained by reacting the polyisocyanate with the polyether polyol for preparing the prepolymer are polyurethane groups. To the prepolymers so prepared a polyisocyanate may be added provided the NCO value remains in the indicated range. The amount added in general is less than 25% by weight based on the total polyisocyanate composition. The added polyisocyanate may be selected from those mentioned above. Aromatic polyisocyanates and in particular MDI based polyisocyanates are preferred.

According to embodiments, the at least one polymer polyetherpolyol is selected from a filled polyether polyol having solid particles in the range of 15-35 wt % calculated on the total weight of the polyol and is having an average ethylene oxide content of maximum 20% by weight, preferably 10-20% by weight, and wherein the ethylene oxide groups are present at the end of the polyether polyol (tipped).

According to embodiments, the at least one polymer polyol is selected from a filled polyether polyol having solid particles in the range of 15-35 wt % calculated on the total weight of the polyol and wherein said polymer polyol is a dispersion of polymer solid particles such as styrene based polymer particles in the polyol. Examples of styrene polymer particles include so-called "SAN" particles of styrene-acrylonitrile.

According to a preferred embodiment, the at least one polymer polyetherpolyol is a mixture of polyols comprising a first polyether polyol and a second polyetherpolyol provided that the mixture is having solid particles in the range of 15-35 wt % calculated on the total weight of the polyol mixture. The molecular weight of the mixture is preferably in the range 4000-7000. The first polyetherpolyol is preferably having a molecular weight in the range of 5000-7000 and an ethylene oxide content of 10-20% by weight and wherein the ethylene oxide groups are present at the end of the polyether polyol (tipped). The second polyetherpolyol is preferably having a molecular weight in the range of 4000-6000, preferably around 5000 and an ethylene oxide content of 10-20% by weight and wherein the ethylene oxide groups are present at the end of the polyether polyol (tipped). The ratio of first polyetherpolyol to the second polyetherpolyol is preferably in the range 20/80 up to 40/60. Suitable examples of the first polyetherpolyol in the polymer polyol include but are not limited to Hyperlite® 1650 (obtained from Bayer), KE® 885 (obtained from Konix), SPEC FLEX NC 700 (obtained from DOW).

According to another preferred embodiment, the at least one polymer polyetherpolyol is a mixture op polyols comprising a first polyether polyol and a second polyetherpolyol provided that the mixture is having solid particles in the range of 15-35 wt % calculated on the total weight of the polyol mixture. The molecular weight of the mixture is preferably in the range 2000-4000. The first polyetherpolyol is preferably having a molecular weight in the range of 1000-2000 and is preferably selected from polytetrahydrofuran (also called polytetramethylene ether glycol). The second polyetherpolyol is preferably having a molecular weight in the range of 4000-6000, preferably around 5000 and having an ethylene oxide content of 10-20% by weight and wherein the ethylene oxide groups are present at the end of the polyether polyol (tipped). The ratio of first polyetherpolyol to the second polyetherpolyol is preferably in the range 80/20 up to 40/60. Suitable examples of the first polyetherpolyol in the polymer polyol include but are not limited to Terathane® from Invista and PolyTHF® from BASF.

According to embodiments, blowing agents may be selected from fluor based hydrocarbon compounds (hydrofluorcarbon compounds) and/or alternatively from acetal based compounds and/or water. The blowing agents used may be a combination of aforementioned compounds.

According to embodiments, the blowing agent may be a fluor based hydrocarbon compound. A suitable fluor based hydrocarbon compound is Forane® 365 (available from Arkema). The amount of fluor based hydrocarbon compound (if used alone) is in the range 3-6 wt % calculated on the total weight of the reaction system.

According to embodiments, the blowing agent may be an acetal based compound. A suitable acetal based compound is Methylal. The amount of acetal based compound as blowing agent (if used alone) is in the range 4-8 wt % calculated on the total weight of the reaction system.

The amount of water used as foaming agent, preferably in the absence of other blowing agents, may be varied in known manner in order to achieve the desired density. Suitable amounts of water are generally at least 0.3 parts by weight, preferably from 0.3-1.3 parts by weight, per 100 parts of the reaction system. Preferably water is the sole blowing agent.

The reaction system further may comprise conventional additives like catalysts, surfactants, colorants, stabilisers, fillers and mold release agents.

Preferably the chain extenders and cross-linkers are polyols having an hydroxyl functionality of 2-6 and preferably 2-4 and a molecular weight of 62-499, like ethylene glycol, (mono) ethylene glycol, diethylene glycol, propylene glycol, dipropylene glycol, butane diol, glycerol, trimethylolpropane, hexanediol, pentaerythritol and polyethylene glycols of MW of 499 and less. The amount of chain extenders and cross-linker is at most 15 parts by weight per 100 parts by weight of polyol used to react with the polyisocyanate composition. More preferably the amount of chain extenders and cross-linker is preferably in the range 5-15 parts by weight per 100 parts by weight of polyol used to react with the polyisocyanate composition According to preferred embodiments, the chain extender is mono-ethyleneglycol (MEG), butanediol and/or hexanediol especially in case rotating moulding is applied.

According to a third aspect of the invention a process for making the polyurethane elastomer according to the first aspect of the invention is disclosed. Said process comprises reacting at an isocyanate index in the range 90-110, preferably in the range 100-105 the reactive system according to the second aspect of the invention. Conventionally the polymer polyetherpolyol is premixed with the chain extenders, catalysts, blowing agents, and other additives and then reacted with the polyisocyanate composition.

The method for making the polyurethane elastomer according to the first aspect of the invention comprises reacting the ingredients of the reaction system in a mould.

According to embodiments, the process for making tires made of the polyurethane cellular elastomer according to the first aspect of the invention comprises at least the steps of:
 i. pre-mixing the polymer polyetherpolyol with the chain extenders, catalysts, blowing agents, and other additives, and
 ii. mixing the polyisocyanate composition with the pre-mixed polymer polyetherpolyol obtained in step i), and
 iii. casting the mixed polyisocyanate composition obtained in step ii) into a mould to obtain a reacted polyisocyanate composition, and then
 iv. curing the reacted polyisocyanate composition obtained in step iii) at an elevated temperature, and then
 v. demoulding the obtained tire made of polyurethane cellular elastomer.

According to embodiments, the step of mixing of the polyisocyanate composition with the pre-mixed polymer polyetherpolyol obtained in step i) is performed using a 2 component high pressure mixing system.

According to embodiments, the step of mixing of the polyisocyanate composition with the pre-mixed polymer polyetherpolyol obtained in step i) is performed using a 2 component dynamic mixing system.

According to embodiments, the step of casting the mixed polyisocyanate composition obtained in step ii) is performed using an open mould, preferably a rotating open mould. The rotation speed may be in the range 150-350 rpm, a suitable rotation speed is 200 rpm.

According to embodiments, the step of curing the reacted polyisocyanate composition obtained in step iii) is performed at elevated temperatures in the range 50-60° C. Preferably the curing is performed in a furnace.

According to embodiments, the moulding process is a rotation moulding process and the chain extender used is selected from mono-ethyleneglycol (MEG), butanediol and/or hexanediol.

The invention is illustrated with the following examples.

EXAMPLES

Chemicals Used:
Water
Forane 365=blowing agent (Arkema)
Oil=abrasion improver (Dow Corning)
Catalyst A=Metal containing skin curing catalyst
Catalyst B=Amine type gelling catalyst
Catalyst C=Surfactant catalyst
Catalyst D=Amine type curing catalyst
Catalyst E=Amine type gelling catalyst
Butanediol 1.4=chain extender
MonoEthyleneGlycol (MEG)=chain extender Polyether polyol A (triol) loaded with SAN particles, MW=5000, 17 wt % EO
Polyether polyol B (triol) MW=6000, 17 wt % EO
Polyether polyol C (Polytetrahydrofurane) MW=2000
Polyether polyol D (triol) MW=4800, 15 wt % EO Isocyanate prepolymer Suprasec® 2733 (Huntsman) having NCO=19.5 and which is reaction product of a 4.4 MDI based polyisocyanate and a polyetherpolyol with 20-35 wt % EO (all tipped) and having a number average MW in range 3000-4000.

Isocyanate prepolymer Suprasec® 2021 (Huntsman) having NCO=23.2 and which is reaction product of a 4.4 MDI based polyisocyanate and an ethylene oxide (EO) free polyetherpolyol having a number average MW below 500.

EXAMPLES 1-2

Preparation of Cellular Polyurethane Elastomeric Composition for making Bicycle Tires The reactive polyisocyanate composition was prepared by mixing the polymer polyol composition with the isocyanate prepolymer composition (index 104). Subsequently the reactive polyisocyanate composition was poured in an open rotating mould (200 rpm) resulting in a bicycle tire. After 5 minutes curing at 50-60° C. in a furnace the solid casting was demoulded from the mould.

Examples 1 and 2 are according to the invention, the comparative example is using a reactive composition according to the state of the art. Table 1 below shows the composition of the reactive systems, more in particular the polymer polyol composition and the isocyanate prepolymer composition used in pbw.

All examples are resulting in cellular polyurethane elastomeric material (here a bicycle tire) having a (moulded) density around 500 kg/m$^3$.

TABLE 1

|  | % wt | | |
| --- | --- | --- | --- |
|  | Comparative | Example 1 | Example 2 |
| Polymer polyol composition (pbw) | | | |
| Forane 365 |  | 4.52 | — |
| Water | 0.45 | — | 0.52 |
| Oil |  | 0.92 | 0.92 |
| Catalyst A | 0.05 | 0.04 | 0.04 |
| Catalyst B | 0.5 | 0.46 | 0.46 |
| Catalyst C | 0.5 | 0.46 | 0.46 |
| Catalyst D |  | 0.18 | 0.18 |
| Butanediol 1.4 |  | 8.46 | 8.46 |
| MonoEthyleneGlycol (MEG) | 10 |  |  |
| polyol A |  | 65.63 | 65.63 |
| polyol B |  | 19.33 | 19.33 |
| Polyol D | 88.5 |  |  |
| Isocyanate composition (Prepolymer) | | | |
| S2733 |  | 100 | 100 |
| S2021 | 100 |  |  |
| NCO | 23.2 | 19.5 | 19.5 |
| Index | 104 | 104 | 104 |

Table 2 below shows the characteristics of the elastomer obtained by reacting the reactive composition according to Table 1 at an isocyanate index of 104.

TABLE 2

| Parameter | Test method | Comparative | Example 1 | Example 2 |
|---|---|---|---|---|
| Abrasion (mg) | DIN ISO 4649-02 | 309 | 59 | 51 |
| Compression Hardness @ 65% (KPa) | DIN ISO 3386-1 | 1929.4 | 2885.2 | 2716.8 |
| Compression set at 70° C. (%) | ASTM D395 | 25.2 | 10.8 | 19.2 |
| Compression set at Room Temp | ASTM D395 | 10 | 3.4 | 4.3 |
| Hardness Shore A | ASTM D2240 | 62 | 69 | 73 |
| Resilience Rebound (% ball rebound) | ASTM D3574 | 28 | 46 | 39 |

EXAMPLE 3

Preparation of Cellular Polyurethane Elastomeric Composition Using Polytetrahydrofurane Based Polymer Polyols The reactive polyisocyanate composition was prepared by mixing the polymer polyol composition with the isocyanate prepolymer composition (index 104) using low pressure mixing. Subsequently the reactive polyisocyanate composition was poured in an open mould. After 5 minutes curing at 50-60° C. in a furnace the solid casting was demoulded from the mould.

Example 3 is according to the invention, the comparative example is using a reactive composition according to the state of the art. Table 3 below shows the composition of the reactive systems, more in particular the polymer polyol composition and the isocyanate prepolymer composition used in pbw.

TABLE 3

| Polymer Polyol composition (pbw) | Comparative @ Shore A hardness 500 | Example 3a @ Shore A hardness 500 | Example 3b @ Shore A hardness 550 | Example 3c @ Shore A hardness 600 |
|---|---|---|---|---|
| Water | 0.45 | 0.28 | 0.25 | 0.23 |
| Catalyst A | 0.05 | 0.02 | 0.02 | 0.02 |
| Catalyst B | 0.5 | | | |
| Catalyst C | 0.5 | 0.5 | 0.5 | 0.5 |
| Catalyst E | | 0.1 | 0.1 | 0.1 |
| MonoEthyleneGlycol (MEG) | 10 | 3 | 3 | 3 |
| polyol A | | 37.39 | 37.39 | 37.39 |
| polyol D | 88.5 | | | |
| polyol C (PTHF) | | 58.75 | 58.75 | 58.75 |
| Isocyanate composition (Prepolymer) | | | | |
| S2733 | | 100 | 100 | 100 |
| S2021 | 100 | | | |
| NCO | 23.2 | 19.5 | 19.5 | 19.5 |
| Index | 104 | 104 | 104 | 104 |

Table 4 below shows the characteristics of the elastomer obtained by reacting the reactive composition according to Table 1 at an isocyanate index of 104.

TABLE 4

| Parameter | Test method | Comparative | Example 3a @ Shore A hardness 500 | Example 3b @ Shore A hardness 550 | Example 3c @ Shore A hardness 600 |
|---|---|---|---|---|---|
| Compression Hardness @ 65% (MPa) | DIN ISO 3386-1 | 1.9 | 2.9 | 3.6 | 4.9 |
| Compression set at 70° C. (%) | ASTM D395 | 25.2 | 13 | 11 | 8 |
| Compression set at Room Temp | ASTM D395 | 10 | 6 | 5 | 6 |
| Hardness Shore A | ASTM D2240 | 62 | 49 | 51 | 52 |
| Resilience Rebound (% ball rebound) | ASTM D3574 | 28 | 64 | 66 | 67 |

Performance of Bicycle Tires made of the Cellular Polyurethane Elastomer according to the Invention The performance of tires made from cellular polyurethane elastomers according to the invention are compared with tires made from cellular polyurethane elastomers according to the state of the art.

Cellular polyurethane elastomer tire 1 is a cellular polyurethane elastomer according to the present invention whereby the tire has a Shore A hardness of 70-75 (using reactive formulation for sample 2 in Table 1).

Cellular polyurethane elastomer tire 2 is a cellular polyurethane elastomer according to the present invention whereby the tire has a Shore A hardness of 60-65 (using reactive formulation for sample 2 in Table 1 with the exception that the amount of butanediol is 7 pbw).

Cellular polyurethane elastomer tire 3 is a cellular polyurethane elastomer according to the present invention whereby the tire has a Shore A hardness of 50 (using reactive formulation for sample 2 in Table 1 with the exception that the amount of butanediol is 5.5 pbw).

The prior art cellular polyurethane elastomer tire 1 is a cellular polyurethane elastomer whereby the tire has a Shore A hardness of 75 (using reactive formulation for comparative example in Table 1).

Table 5 illustrates the power performance for tires loaded with a total weight of 25, 50 and 100 kg and the power required to achieve a speed of 20 km/h.

It can be concluded that the lower the power, the better (lower) the rolling resistance and hence the performance of the tire. An improvement of more than 20% is achieved when using the cellular polyurethane composition of the invention.

TABLE 5

| Type of Tire | Weight (kg) | Speed (km/h) | Power (W) |
|---|---|---|---|
| Cellular polyurethane elastomer tire 1 | 25 | 20 | 27.0 |
|  | 50 | 20 | 61.3 |
|  | 100 | 20 | 161.6 |
| cellular polyurethane elastomer tire 2 | 25 | 20 | 29.8 |
|  | 50 | 20 | 64.7 |
|  | 100 | 20 | 164.5 |
| cellular polyurethane elastomer tire 3 | 25 | 20 | 32.0 |
|  | 50 | 20 | 70.8 |
|  | 100 | 20 | 176.5 |
| Prior art cellular polyurethane elastomer tire | 25 | 20 | 33.7 |
|  | 50 | 20 | 75.8 |
|  | 100 | 20 | 195.0 |

The invention claimed is:

1. A tire comprising a cellular polyurethane or polyurethane-urea elastomeric material made from the reaction of:
   i) a polyisocyanate composition having a free NCO-value of 15-25% by weight comprising an isocyanate-terminated prepolymer which is the reaction product of an excess of an organic polyisocyanate and a polyether polyol having an average nominal hydroxyl functionality of 2-6, a number average molecular weight of 2000-6000 and an oxyethylene content of 20-35% by weight, wherein at least 50% of the oxyethylene groups are present at the end of the polyether polyol;
   ii) a polymer polyetherpolyol wherein the polymer polyetherpolyol consists of (a) at least one polyetherpolyol having a maximum oxyethylene content of 20% by weight calculated on the total weight of the at least one polyetherpolyol, (b) a second polyetherpolyol having an oxyethylene content of 10-20% by weight calculated on the total weight of the second polyetherpolyol, and (c) solid particles; and wherein a mixture of (a) and (b) has a weighted average molecular weight in the range of 4000-7000 and wherein the amount of solid particles is in the range of 15-35 wt % calculated on the total weight of the polymer polyetherpolyol;
   iii) a chain extender;
   iv) at least one of a catalyst and crosslinker; and
   v) a blowing agent, said cellular polyurethane or polyurethane-urea elastomeric material having the following properties:
   Shore A hardness according to ASTM D2240 of at least 45 and lower than 85;
   Compression set at room temperature lower than 10% and at 70° C. lower than 40% according to ASTM D395; and
   Ball rebound according to ASTM D3574 of at least 40% and wherein the tire is filled with the elastomeric material.

2. A tire according to claim 1, wherein the tire is a low speed vehicle tire.

3. A tire according to claim 1, wherein the elastomeric material has a moulded density in the range 400-700 kg/m³ according to ISO 845.

4. A reaction system comprising:
   i) a polyisocyanate composition having a free NCO-value of 15-25% by weight comprising an isocyanate-terminated prepolymer which is the reaction product of an excess of an organic polyisocyanate and a polyether polyol having an average nominal hydroxyl functionality of 2-6, a number average molecular weight of 2000-6000 and an oxyethylene content of 20-35% by weight, wherein at least 50% of the oxyethylene groups are present at the end of the polyether polyol;
   ii) a polymer polyetherpolyol wherein the polymer polyetherpolyol consists of (a) at least one polyetherpolyol having a maximum oxyethylene content of 20% by weight calculated on the total weight of the at least one polyetherpolyol, (b) a second polyetherpolyol having an oxyethylene content of 10-20% by weight calculated on the total weight of the second polyetherpolyol, and (c) solid particles, and wherein a mixture of (a) and (b) has a weighted average molecular weight in the range of 4000-7000 and wherein the amount of solid particles is in the range of 15-35 wt % calculated on the total weight of the polymer polyetherpolyol;
   iii) at least one of a chain extender and cross-linker;
   iv) a catalyst; and
   v) a blowing agent,
   and wherein the reaction system, upon reacting, provides a cellular polyurethane elastomeric material having the following properties: a shore A hardness according to ASTM D2240 of at least 45 and lower than 85; a compression set at room temperature lower than 10% and at 70° C. lower than 40% according to ASTM D395; and a ball rebound according to ASTM D3574 of at least 40%.

5. A reaction system according to claim 4, wherein the organic polyisocyanate used in the preparation of the polyisocyanate composition is selected from an aliphatic polyisocyanate, a cycloaliphatic polyisocyanate, an araliphatic polyisocyanate and a mixture thereof.

6. A reaction system according to claim 4, wherein the polyether polyol used for preparing the prepolymer has an average nominal functionality of 2-4 and a number average molecular weight of 3000-5000.

7. A reaction system according to claim 4, wherein the polyether polyol used for preparing the prepolymer is obtained from the polymerization of ethylene oxide with propylene oxide in the presence of a diol and/or a triol.

8. A reaction system according to claim 4, wherein (a) the at least one polyetherpolyol has an oxyethylene content of 10-20% by weight and wherein the oxyethylene groups are present at the end of the at least one polyetherpolyol.

9. A reaction system according to claim 4, wherein the solid particles comprise styrene based polymer particles.

10. A reaction system according to claim 4, wherein
(a) the at least one polyetherpolyol has a molecular weight in the range of 5000-7000 and an oxyethylene content of 10-20% by weight and the oxyethylene groups are present at the end of (a) the at least one polyetherpolyol, and
(b) the second polyetherpolyol has oxyethylene groups present at the end of (b) the second polyetherpolyol.

11. A reaction system according to claim 10, wherein the ratio of
(a) the at least one polyetherpolyol to (b) the second polyetherpolyol is in the range of 80/20 to 40/60.

12. A reaction system according to claim 4, wherein the blowing agent is selected from a hydrofluorocarbon compound, an acetal based compound, water and a mixture thereof.

13. A reaction system according to claim 4, wherein the blowing agent is an acetal based compound and is present in the range of 4-8 wt % calculated on the total weight of the reaction system.

14. A reaction system according to claim 4, wherein the blowing agent is water and is present in the range of at least 0.3 parts by weight per 100 parts by weight of the reaction system.

15. A reaction system according to claim 4, wherein the chain extender is a polyol having a hydroxyl functionality of 2-6 and a molecular weight of 62-499 and wherein the amount of chain extender present is at most 15 parts by weight per 100 parts by weight of polymer polyetherpolyol.

16. A reaction system according to claim 15, wherein the chain extender is monoethylene glycol, butanediol, or hexanediol.

17. A process for making a cellular polyurethane elastomer said process comprising reacting at an isocyanate index in the range 90-110 the reaction system according to claim 4 in a mould.

18. A process according to claim 17 wherein the polymer polyetherpolyol is premixed with the at least one of a chain extender and crosslinker, the catalyst and the blowing agent and then reacted with the polyisocyanate composition.

19. A process for making a tire made of a cellular polyurethane or polyurethane-urea elastomeric material comprising:

i) providing a polymer polyetherpolyol wherein the polymer polyetherpolyol consists of: (a) at least one polyetherpolyol having a molecular weight in the range of 5000-7000 and a maximum oxyethylene content of maximum 20% by weight calculated on the total weight of the at least one polyetherpolyol, (b) a second polyetherpolyol having a molecular weight of 4000-6000 and an oxyethylene content of 10-20% by weight calculated on total weight of the second polyetherpolyol, and (c) solid particles, wherein the amount of solid particles is in the range of 15-35 wt % calculated on the total weight of the polymer polyetherpolyol; a catalyst; a blowing agent; and at least one of a chain extender and crosslinker; and then ii) mixing a polyisocyanate composition with the polymer polyol composition of step i) to form a mixed polyisocyanate composition, wherein the polyisocyanate composition has a free NCO-value of 15-25% by weight comprising an isocyanate-terminated prepolymer which is the reaction product of an excess of an organic polyisocyanate and a polyether polyol having an average nominal hydroxyl functionality of 2-6, a number average molecular weight of 2000-6000 and an oxyethylene content of 20-35% by weight, wherein at least 50% of the oxyethylene groups are present at the end of the polyether polyol; and then iii) casting the mixed polyisocyanate composition obtained in step ii) into a mould to obtain a reacted polyisocyanate composition, and then iv) curing the reacted polyisocyanate composition obtained in step iii) at an elevated temperature, and then v) demoulding the obtained tire made of polyurethane cellular elastomer wherein the elastomeric material has the following properties: a shore A hardness according to ASTM D2240 of at least 45 and lower than 85; a compression set at room temperature lower than 10% and at 70° C. lower than 40% according to ASTM D395; and a ball rebound according to ASTM D3574) of at least 40%.

20. A process according to claim 19, wherein the step of mixing of the polyisocyanate composition with the polymer polyol composition obtained in step i) is performed using a 2 component high pressure mixing system or a 2 component dynamic mixing system and wherein the step of casting the mixed polyisocyanate composition obtained in step ii) is performed using an open mould, and wherein the step of curing the reacted polyisocyanate composition obtained in step iii) is performed at an elevated temperature in the range 50°–60° C.

* * * * *